April 7, 1970     A. KUSCHNEREIT     3,504,783
METHOD AND APPARATUS FOR SEPARATING TANGLED, COILED HELIXES
Filed Dec. 9, 1968     2 Sheets-Sheet 1
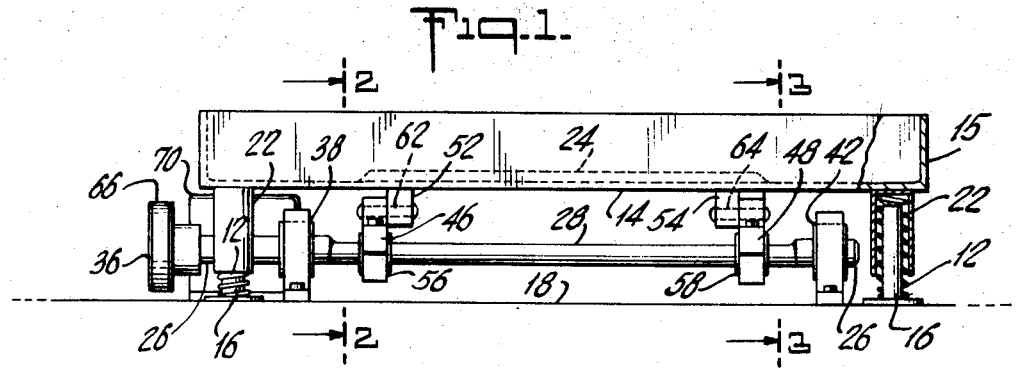
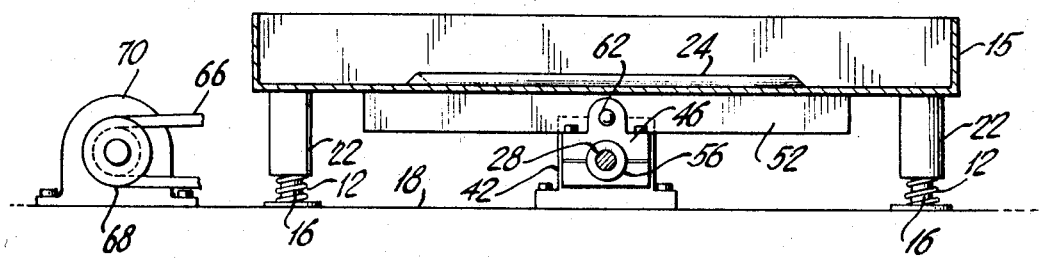
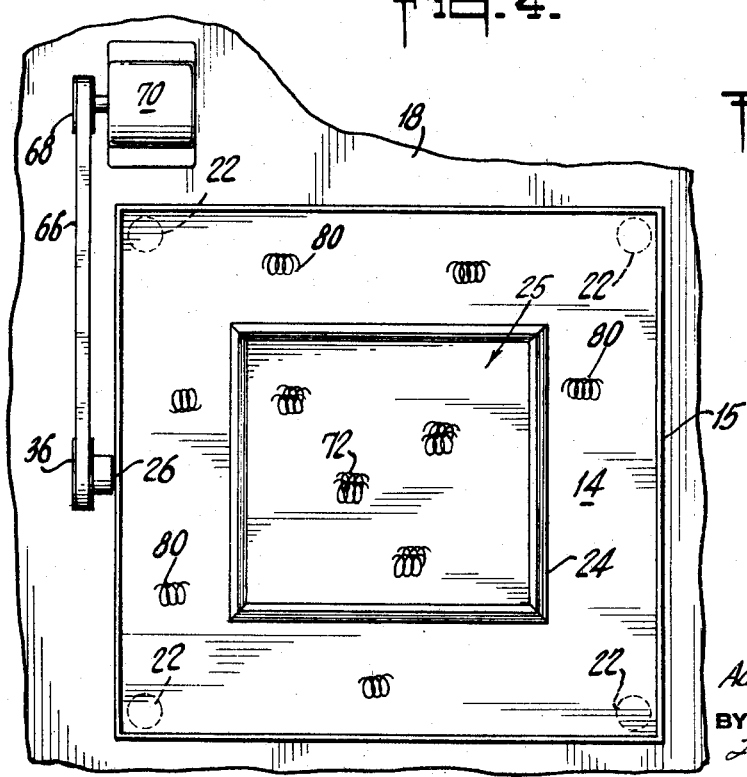
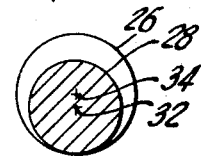
INVENTOR
AUGUST KUSCHNEREIT
BY *Lawrence J. Marhoefer*
ATTORNEY

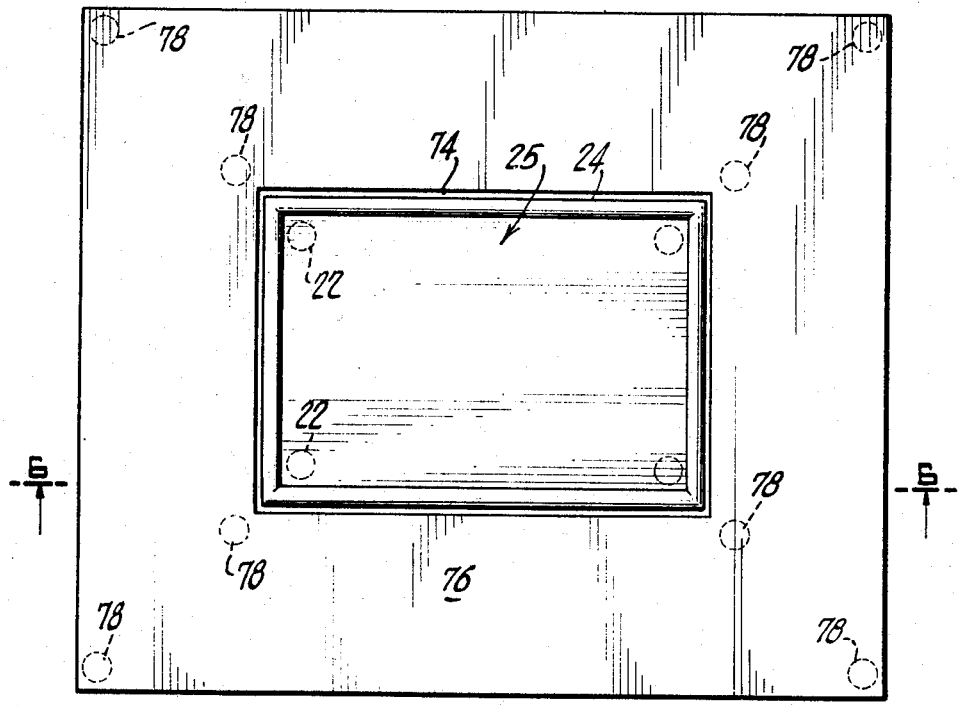
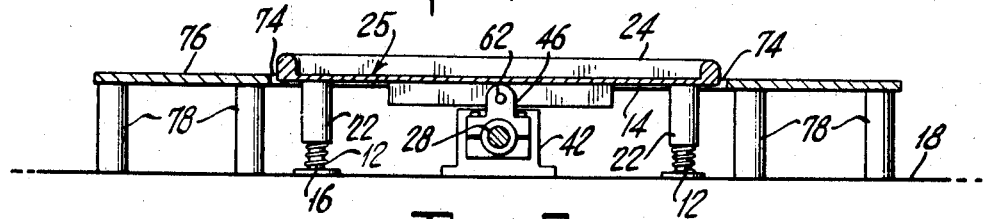
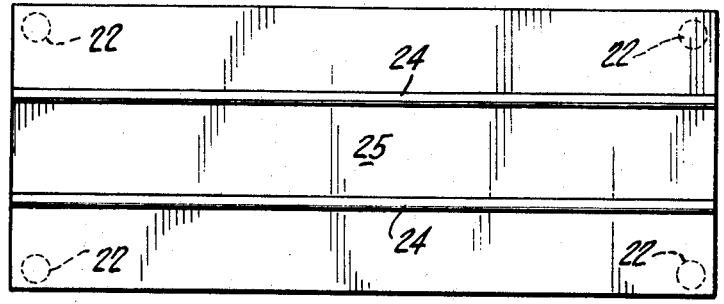

United States Patent Office 3,504,783
Patented Apr. 7, 1970

3,504,783
METHOD AND APPARATUS FOR SEPARATING TANGLED, COILED HELIXES
August Kuschnereit, 38 Nostrand Ave., Brentwood, N.Y. 11717
Filed Dec. 9, 1968, Ser. No. 791,840
Int. Cl. B01f 9/00; B65g 47/24
U.S. Cl. 198—33
12 Claims

ABSTRACT OF THE DISCLOSURE

The specification and drawings disclose a vibrating plate for separating tangled, coiled helixes in which the plate vibrates the helixes without translational motion thereof and causes freed helixes to be thrown clear of the tangled mass.

BACKGROUND OF THE INVENTION

This invention relates to the art of separating tangled helical articles of manufacture such as coiled compression springs, coiled heating elements, incandescent lamp filaments, and other similar items, and, more particularly, to a method and apparatus for rapidly and economically disentangling large quantities of such articles.

During manufacture, shipping, and storage of small, helical articles, two or more often become intermeshed and intertwined. This problem is especially common with those helixes that have a gap between adjacent turns; small coiled compression springs are one common example of such helixes.

A machine has been proposed in the prior art for separating coiled compression springs and other similar helical articles. However, it has not proved entirely satisfactory because it operates too slowly for economical efficiency. Thus, still the most widely used method for separating tangled helical objects is to separate them by hand, employing pliers if necessary. Hand separation is not only slow and tedious but also expensive, particularly in the case of small coiled compression springs and the like where the cost of separating the item is comparable to the cost of the item itself. Furthermore, it is not uncommon to coat various helical articles with a protective or an identifying coating, and these coatings are often damaged when the articles are separated by hand. In fact, the articles themselves are sometimes damaged during separation.

One object of this invention is the provision of a new method for rapidly and economically separating large quantities of tangled helical articles; a related object of the invention is to provide an effective apparatus for practicing this method.

A still further object of the invention is the provision of a method and apparatus for separating tangled helical articles without damaging them.

SUMMARY OF THE INVENTION

Briefly, this invention contemplates freeing helical articles from a tangled mass of such articles by vibrating the mass. The tangled mass is placed on a flat vibrating surface which exerts no force that tends to impart an average movement to the tangled mass. A relatively small amplitude and high frequency vibration of the surface frees individual helixes in a more or less continuous fashion and tends to throw them clear of the mass while those remaining tangled in groups of two or more tend to stay gathered in a mass until freed by the vibration.

DESCRIPTION OF THE DRAWINGS

Having briefly described the invention, it will be described in greater detail along with other objects and advantages in the following detailed description of a preferred embodiment which may be best understood by reference to the accompanying drawings. These drawings form part of the instant specification and are to be read in conjunction with it. Like reference numerals are used to indicate like parts in the various views, in which:

FIGURE 1 is a front elevation of one embodiment of an apparatus for separating tangled helixes in accordance with the teachings of this invention.

FIGURE 2 is a sectional view taken along the line 2—2 of FIGURE 1.

FIGURE 3 is a sectional view taken along the line 3—3 of FIGURE 1 with parts omitted in this view for clarity.

FIGURE 4 is a plan view of the apparatus shown in FIGURES 1 and 2.

FIGURE 5 is a plan view of another embodiment of an apparatus for separating tangled helixes in accordance with this invention.

FIGURE 6 is a partial sectional view taken along the line 6—6 of FIGURE 5.

FIGURE 7 is a plan view of still another embodiment of the apparatus of the invention.

DESCRIPTION OF THE PREFERRED EMBODIMENTS

Referring now to FIGURES 1 through 4 of the drawings, four coiled compression spring 12 support a plate 14 so that it lies flat yet is free to vibrate. As will be explained more fully hereinafter, a central region 25 of the plate 14 is adapted to receive the tangled mass of helixes (hereinafter sometimes referred to as springs). Conveniently, the plate has four upstanding side walls 15.

One spring is located at each corner of the plate 14 and each extends between a base 18 (such as a work table or a floor) and the lower surface of the plate. A post 16 extending upwardly from and affixed to the base 18, and a sleeve 22 extending downwardly from and affixed to the plate 14 serve to restrain lateral movement of the springs 12 and the plate 14. As will be appreciated readily by those skilled in the art, the clearance between the posts 16, the sleeves 22 and the springs 12 determine the amount of lateral movement possible.

As previously explained, the springs 12 support the plate 14 so that it lies flat. This means that the springs 12 support the plate 14 so that it lies in a plane in which the gravitational force acting on an object resting on its surface acts perpendicularly to the surface. In this way there is no gravitational force which would tend to move a mass of tangled springs vibrating on the surface of the plate 14.

As can be seen most clearly in FIGURE 4, low bead 24 surrounds the central region 25. This bead 24 is affixed to the plate 14 in a suitable manner known in the art and serves both to demarcate the central region 25 and to form a low barrier which tends to prevent groups of two or more intermeshed or intertwined helixes from being thrown from the mass without appreciably inhibiting the outward movement of freed helixes. Preferably the height of the barrier is less than the diameter of each individual helix.

The plate 14 is vibrated or shaken by an eccentric drive. Two bearings 38 and 42 support a shaft 26 and permit it to rotate freely about its longitudinal central axis 34. A section 28 of shaft 26 intermediate the bearings 38 and 42 has a slightly reduced diameter; the longitudinal central axis 32 of this section is slightly offset from the axis 34, thereby providing the eccentric motion.

Two links 46 and 48 respectively couple the section 28 of the shaft 26 to two bars 52 and 54 which extend along and are secured to the plate 14. Bearings 56 and 58 respectively secure one end of the links 46 and 48 to the section 28 and permit free rotation of the section 28. Pins 62 and 64 secure the other ends of links 46 and 48 to the bars 52 and 54 and permit relative rotational movement between bars and links.

Although any suitable drive known in the art may be employed, a belt drive is convenient. In the embodiment of the invention shown, an endless belt 66 driven by an electric motor 70 frictionally engages and drives a pulley 68 secured to the shaft 26.

In operation, a mass of tangled coiled compression springs 72, for example (shown only in FIGURE 4 for convenience), is placed in the region 25 of the plate 14 defined by the barrier forming bead 24. As the shaft 26 is rotated by the motor 70 it causes the plate 14 to vibrate or shake. For springs about ½ inch long and ¼ inch in diameter, a satisfactory amplitude of vibration can range between ⅛ and ¹⁄₁₆ of an inch, for example, at a speed of about 1700 cycles per second. Of course, this frequency and the amplitude of the vibration may be varied in order to get the best results for a particular helix.

Owing to the fact that neither the mounting arrangement nor the method of vibrating the plate 14 causes a resultant force on the mass of tangled springs 72, the tangled mass vibrates without moving beyond the barrier 24. However, the vibration does free individual springs 80 from the mass and throws them beyond the barrier. Thus, in operation, the tangled mass generates a more or less continuous supply of freed springs which become randomly distributed on the plate 14 in the area outside the barrier 24. Here they can be readily seen and removed from the plate by hand. Occasionally two or more helixes that are still intertwined are thrown beyond the bead 24; these may be returned to the central region where they will eventually become disentangled.

Referring now to FIGURES 5 and 6, in this embodiment only the region 16 within the bead 24 is vibrated. A spring mount 12 at each of the four corners of region 25 resiliently mount the plate 14 in the manner previously explained in connection with FIGURES 1 and 2; the plate may be vibrated also in the same manner as that previously explained.

A small gap 74 separates and isolates the plate 14 from an apron 76 which is rigidly mounted on posts 78. This embodiment of the invention may be advantageous in that if desired the apron may be vibrated in a mode known in the art so as to impart a net translational movement to the freed springs in order to automatically feed them to a utilizing machine. Alternately, the apron 74 conveniently may serve as a removable tray, if desired.

It will be understood that the central region 16 need not be rectangular. It may be circular or any other suitable geometric configuration. FIGURE 7 shows an embodiment of the invention similar to that shown in FIGURE 1 except here the region 16 defined by the bead 24 defines a relatively extensive trough along which more than one worker can be stationed.

It will be understood that certain features and sub-combinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:
1. A method for separating intermeshed and intertwined helical objects comprising the steps of:
   placing a mass of intermeshed and intertwined helical objects on a horizontal surface, where the force of gravity acting on the mass acts perpendicularly to said surface,
   vibrating the mass of intermeshed and intertwined helical objects to separate individual helixes from said mass and throw them clear thereof,
   catching said individual helixes thrown clear of said mass.
2. A method for separating intermeshed and intertwined helical objects as in claim 1 wherein the amplitude of said vibration is less than the diameter of the respective helixes which comprise said mass.
3. A method for separating intermeshed and intertwined helixes as in claim 2 wherein the frequency of vibration exceeds 1000 cycles per second.
4. Apparatus for separating intermeshed and intertwined helical objects comprising in combination:
   a horizonal supporting surface for a mass of intermeshed and intertwined helical objects arranged so that the force of gravity acting on said mass acts perpendicularly to said surface,
   means for vibrating a mass of intermeshed and intertwined helixes on said horizontal supporting surface,
   means for catching individual helixes thrown free of said mass.
5. Apparatus for separating intermeshed and intertwined helical objects as in claim 4 wherein said support is a plate resiliently mounted.
6. Apparatus for separating intermeshed and intertwined helical objects as in claim 5 further including a barrier affixed to said plate which demarcates a region where said mass of springs is vibrated and provides a barrier to the removal from said mass of two or more joined together helixes.
7. Apparatus for separating intermeshed and intertwined helical objects as in claim 6 wherein the height of said barrier is less than the diameter of each of said helixes.
8. Apparatus for separating intermeshed and intertwined helical objects as in claim 6 wherein said vibrating means reciprocally drives said plate.
9. Apparatus for separating intermeshed and intertwined helical objects as in claim 8 wherein said vibrating means includes an eccentric driving means.
10. Apparatus for separating intermeshed and intertwined helical objects as in claim 8 wherein said vibrating means produces a maximum excursion which is less than the diameter of each of said helixes at a frequency in excess of 1000 cycles per second.
11. Apparatus for separating intermeshed and intertwined helical objects as in claim 6 wherein said means for catching individual helixes is an extension of said vbrating plate beyond said barrier.
12. Apparatus for separating intermeshed and intertwined helical objects as in claim 6 wherein said means for catching individual helixes includes a surface lying outside said barrier which is separated from said plate.

References Cited

UNITED STATES PATENTS

| | | | |
|---|---|---|---|
| 2,760,679 | 8/1956 | Chadderton | 198—33 X |
| 2,867,313 | 1/1959 | Deshaw | 198—33 |
| 3,042,181 | 7/1962 | Rise | 198—33 |

EDWARD SROKA, Primary Examiner

U.S. Cl. X.R.

214—152; 259—72